C. A. ATHERTON.
REDUCTION GEARING FOR ELECTRIC MOTORS.
APPLICATION FILED MAY 15, 1917.
1,300,236.
Patented Apr. 15, 1919.
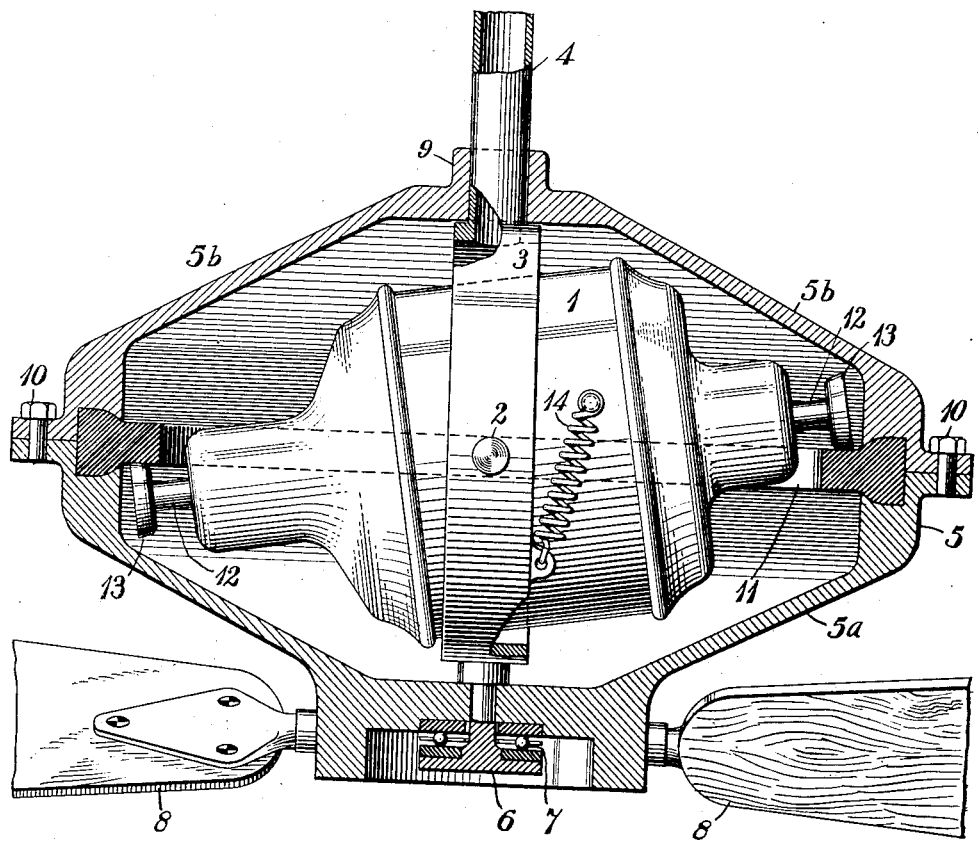
WITNESSES:
Fred H. Miller
O. W. Kennedy
INVENTOR
Carlyle A. Atherton
BY
Wesley G. Carr
ATTORNEY

UNITED STATES PATENT OFFICE.

CARLYLE A. ATHERTON, OF BOWDON, ENGLAND, ASSIGNOR TO WESTINGHOUSE ELECTRIC & MANUFACTURING COMPANY, A CORPORATION OF PENNSYLVANIA.

REDUCTION-GEARING FOR ELECTRIC MOTORS.

1,300,236.  Specification of Letters Patent.  Patented Apr. 15, 1919.

Application filed May 15, 1917. Serial No. 168,703.

*To all whom it may concern:*

Be it known that I, CARLYLE A. ATHERTON, a citizen of the United States, and a resident of Bowdon, in the county of Chester, England, have invented a new and useful Improvement in Reduction-Gearing for Electric Motors, of which the following is a specification.

My invention relates to reduction gearing for electric motors, and it has for its object to provide an improved arrangement of motor and gearing which shall be very compact and give a considerable speed reduction. The invention is particularly applicable in connection with electric-motor driven fans but may be used for other purposes, more especially with motors of comparatively small power.

The single figure of the accompanying drawing is a view, partially in section and partially in side elevation, illustrating my invention as applied in connection with a slow-speed ceiling fan.

A motor 1 is mounted on pivots 2 within a ring 3 which is supported by a fixed hanger rod 4. The motor is unsymmetrically mounted with respect to its center of gravity so that it tends to rotate about its pivotal axis under the influence of gravity. A frame or casing 5 entirely incloses the motor 1 and is preferably formed of two parts, the lower part 5ª being rotatably supported upon an extension 6 of the ring 3 by means of a bearing 7. The lower part 5ª is provided with a plurality of radially-extending fan blades 8. The upper part 5ᵇ is provided with a bearing sleeve 9 surrounding the rod 4 and is secured to the lower part 5ª by suitable bolts 10.

An annular gear member 11 is clamped between the parts of the frame 5 and is provided with operating faces that are located on opposite sides of a horizontal plane containing the pivotal axis of the motor 1. The shaft 12 of the motor 1 is provided, at its respective ends, with gear members 13, the motor being tilted upon its pivotal axis so that the gear members 13 engage opposite faces of the annular gear member 11. As the motor 1 tends to rotate about its pivotal axis, under the influence of gravity, the gear members 13 are maintained in engagement with the operating faces of the gear member 11, with considerable pressure. The ends of a tension spring 14 are connected to the motor 1 and to the ring 3, respectively, in order to increase the pressure exerted between the gear members. While the gear members are shown as being in frictional engagement, it will be readily understood that toothed gearing may be employed whenever it is desirable to transmit a considerable amount of power.

While I have shown my invention in its simplest and preferred form, it is not so limited but is susceptible of various minor changes and modifications within the scope of the appended claims.

I claim as my invention:

1. The combination with a fixed support and a motor pivotally mounted thereon, of a frame inclosing said motor and rotatably mounted on said support, and gearing located therein for rotating said frame.

2. The combination with a fixed support and a motor pivotally mounted thereon, of a frame rotatably mounted on said support, and means comprising a gear member surrounding said motor for rotating said frame.

3. The combination with a fixed support and a motor pivotally mounted thereon, of a frame rotatably mounted on said support and provided with a gear member surrounding said motor and operatively connected thereto for rotating said frame.

4. The combination with a fixed support and a motor pivotally mounted thereon, of a frame rotatably mounted on said support, a gear member carried by said frame and provided with a plurality of operating faces surrounding said motor, and gear members carried by the shaft of said motor in engagement with the respective faces of said first named gear member.

5. The combination with a fixed support, a motor pivotally mounted thereon and a gear member mounted on the shaft of said motor, of a frame rotatably mounted on said support and provided with a gear member surrounding said motor, and means for biasing said motor about its pivotal axis to cause engagement between the said gear members.

6. The combination with a fixed support, a motor pivotally mounted thereon, and gear members carried by the shaft of said motor, of a frame rotatably mounted on said support, a gear member carried by said frame and provided with a plurality of operating faces surrounding said motor, and means for biasing said motor about its pivotal axis to cause engagement between the said shaft-carried gear members and the respective faces of said second-named gear member.

7. The combination with a fixed support and a motor pivotally mounted thereon, of a frame rotatably mounted on said support and provided with a gear member surrounding said motor, and means for biasing said motor about its pivotal axis into operative engagement with said gear member for rotating said frame.

8. The combination with a fixed support and a motor pivotally mounted thereon so as to tend to rotate about its pivotal axis under the influence of gravity, of a frame rotatably mounted on said support and provided with a gear member surrounding said motor and adapted to be operatively engaged by the shaft of said motor as it rotates about its pivotal axis.

9. In a revolving fan mechanism, the combination with a fixed support and a motor pivotally mounted thereon, of a frame inclosing said motor rotatably mounted on said support and provided with a plurality of fan blades, and gearing located within said frame for rotating said frame.

In testimony whereof, I have hereunto subscribed my name this 16th day of April 1917.

CARLYLE A. ATHERTON.

Copies of this patent may be obtained for five cents each, by addressing the "Commissioner of Patents, Washington, D. C."